US009991028B2

(12) United States Patent
Montalvo

(10) Patent No.: US 9,991,028 B2
(45) Date of Patent: Jun. 5, 2018

(54) SYSTEM AND METHOD FOR PROTECTING A DOWNHOLE CABLE

(71) Applicant: V & H Energy Suppliers, LLC, Woodlands, TX (US)

(72) Inventor: Patricio Montalvo, Quito (EC)

(73) Assignee: V & H Energy Suppliers, LLC, Woodlands, TX (US)

( * ) Notice: Subject to any disclaimer, the term of this patent is extended or adjusted under 35 U.S.C. 154(b) by 0 days. days.

(21) Appl. No.: 14/792,609

(22) Filed: Jul. 7, 2015

(65) Prior Publication Data

US 2017/0011821 A1 Jan. 12, 2017

(51) Int. Cl.
*H01B 7/00* (2006.01)
*H01B 7/28* (2006.01)
*H02G 3/04* (2006.01)

(52) U.S. Cl.
CPC ......... *H01B 7/2806* (2013.01); *H02G 3/0487* (2013.01)

(58) Field of Classification Search
CPC .. H02G 3/22; H02G 3/24; H02G 3/26; H02G 3/283; H02G 3/30; H02G 3/32; H02G 3/36; H02G 3/383; H02G 3/0487; H01B 7/24; H01B 7/2806; H01B 13/26; H01B 7/28; H01B 13/00; B60R 16/0215; B60R 16/02
USPC .......... 174/481, 480, 68.1, 68.3, 72 A, 70 C, 174/72 C, 135, 88 R, 100, 40 CC; 248/49, 68.1, 74.1, 74.2, 74.3, 61, 62
See application file for complete search history.

(56) References Cited

U.S. PATENT DOCUMENTS

| | | | | |
|---|---|---|---|---|
| 2,812,380 A * | 11/1957 | Lehrke | ................... | H02G 9/065 248/61 |
| 4,766,651 A * | 8/1988 | Kobayashi | .......... | B60R 16/0215 248/74.3 |
| 4,864,082 A * | 9/1989 | Ono | ...................... | H02G 3/0437 174/101 |
| 5,401,905 A * | 3/1995 | Lesser | ..................... | H02G 3/26 174/68.3 |
| 5,632,457 A * | 5/1997 | Neely, Jr. | ............ | B60R 16/0215 248/74.3 |
| 6,878,879 B2 * | 4/2005 | Takahashi | ............ | H02G 3/0418 174/68.3 |
| 7,825,339 B2 * | 11/2010 | Suzuki | ................ | B60R 16/0215 174/101 |
| 7,861,981 B2 * | 1/2011 | Olver | ....................... | H02G 3/32 248/68.1 |
| 7,964,796 B2 * | 6/2011 | Suzuki | ................ | B60R 16/0215 174/72 A |
| 8,124,887 B2 * | 2/2012 | Suzuki | ................ | B60R 16/0215 174/481 |

(Continued)

*Primary Examiner* — Angel R Estrada
(74) *Attorney, Agent, or Firm* — Spradley PLLC; Michael Spradley

(57) ABSTRACT

This disclosure relates to a system and method for protecting a downhole cable. A cable protection system can comprise a cable clamp. The cable clamp can comprise a pair of outer segments that can protrude in opposite directions and a middle segment that can connect the outer segments. Each of the outer segments can comprise an outer segment top portion and outer segment side portions. The outer segment top portion and the outer segment side portions can be connected substantially in a U-shape. Each of the outer segment side portions can comprise one or more slots.

9 Claims, 7 Drawing Sheets

(56) References Cited

U.S. PATENT DOCUMENTS 8,188,368 B2 * 5/2012 Suzuki ............... B60R 16/0215
174/68.3

* cited by examiner

SYSTEM AND METHOD FOR PROTECTING A DOWNHOLE CABLE

BACKGROUND

This disclosure relates to a system and method for protecting a downhole cable.

In the petroleum industry, artificial lift is one of the methods used to increase the production of oil from a wellbore. One example of the device used in artificial lift is an electric submersible pump (ESP) that consists of an electrical motor, which requires electrical power. To operate the ESP, wires and/or cables can be used to connect the ESP from a site to a power source from the surface. Coupling cable protector can then used to secure and protect the wires, and/or electrical cable to the production tubing of the well.

Methods for protecting downhole cable have evolved over the years. The most common cable protector comprises movable parts that are usually fixed on one side and fastened through pins, and/or screws. However, since cable protectors are exposed to elements that can corrode the device, cable protectors that comprise moving parts can be unreliable. Furthermore, most cable protector designs are usually bulky and heavy, which can cause inconvenience during transportation. Additionally, since such cable protector design weighs more, costs on shipments and/or export fees can also be expensive. As such it would be useful to have an improved system and method for protecting a downhole cable.

SUMMARY

This disclosure relates to a system and method for protecting a downhole cable. A cable protection system can comprise a cable clamp. The cable clamp can comprise a pair of outer segments that can protrude in opposite directions and a middle segment that can connect the outer segments. Each of the outer segments can comprise an outer segment top portion and outer segment side portions. The outer segment top portion and the outer segment side portions can be connected substantially in a U-shape. Each of the outer segment side portions can comprise one or more slots. At least a substantial portion of the middle segment can be predominantly raised relative to the outer segment top portions.

DETAILED DESCRIPTION

Described herein is a system and method for protecting a downhole cable. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
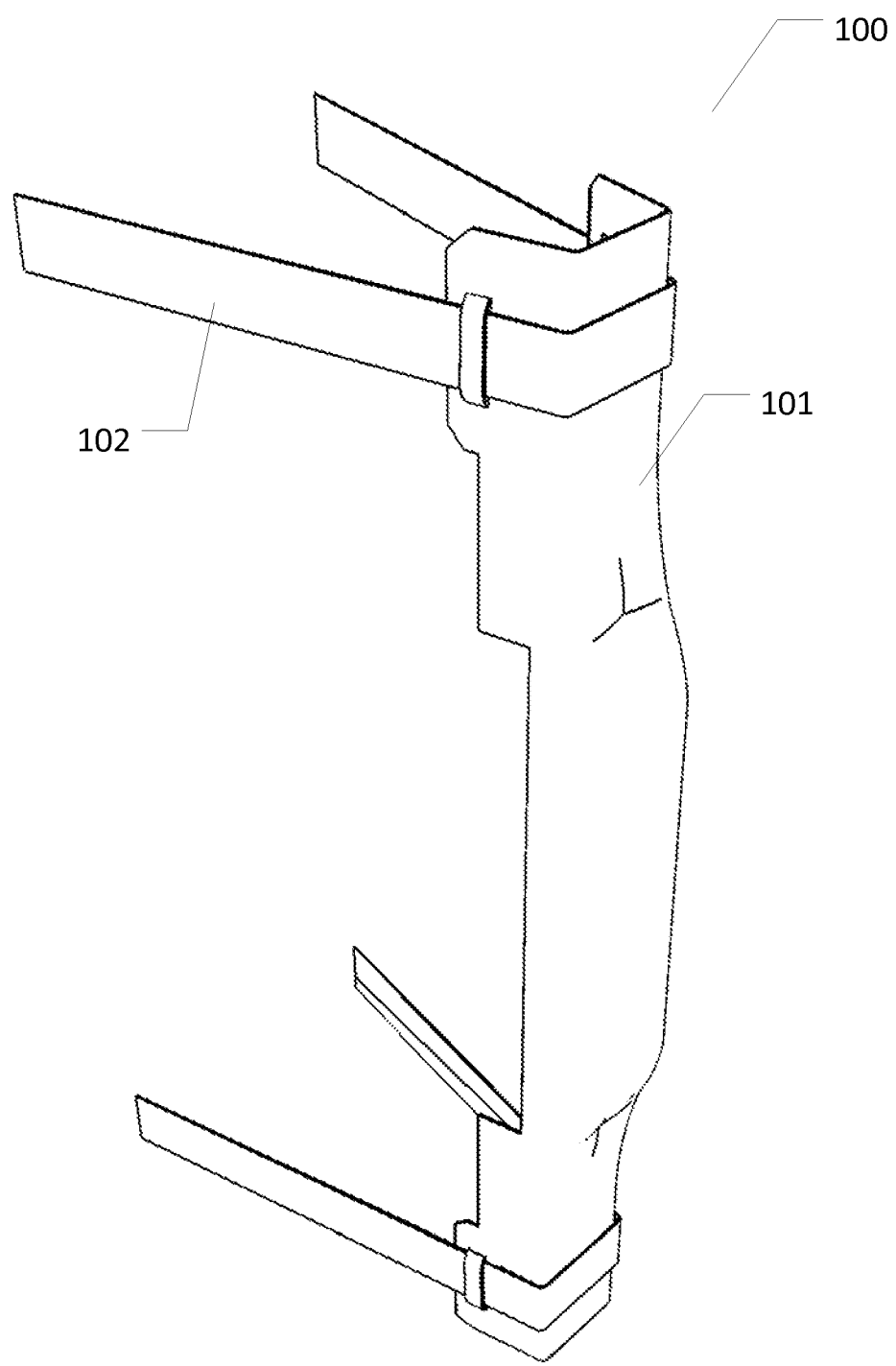
FIG. 1 illustrates a cable protection system.

FIG. 1 illustrates a cable protection system 100. Cable protection system 100 can secure and protect cables, control lines, or encapsulated bundles in a wellbore. Cable protection system 100 can comprise a cable clamp 101 and a pair of strips 102. Cable clamp 101 and strips 102 can be a thin sheet casing that is made of durable and pliable material such as steel. Cable clamp 101 can provide protection and enclosure to cables, and/or control lines used in a well bore. Strips 102 and cable clamp 101 together secure cables, pipes, or control lines to production tubing.

Figure 2:
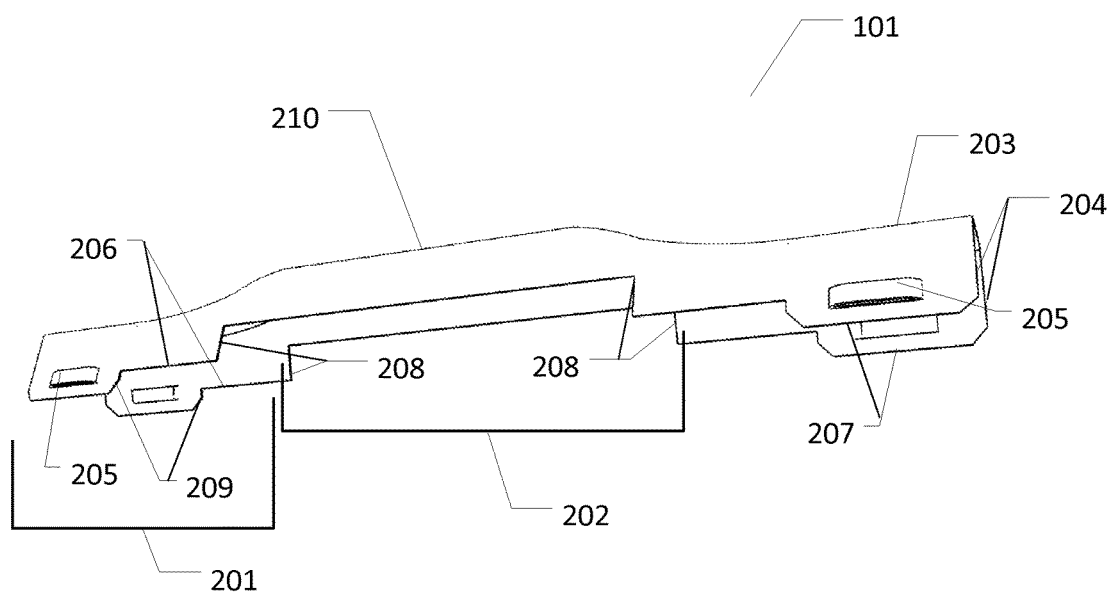
FIG. 2 illustrates a cable clamp comprising a pair of outer segments and a middle segment.

FIG. 2 illustrates cable clamp 101 comprising a pair of outer segments 201 and a middle segment 202. Outer segments 201 can be at the opposite lateral ends of cable clamp 101, which protrudes in opposite directions. Each outer segment 201 can comprise an outer segment top portion 203 and a pair of outer segment side portions 204. Each outer segment top portion 203 and outer segment side portions 204 connected substantially in a U-shape. In such structure, the bottom of the U-shape can be outer segment top portion 203 of outer segments 201 while outer segment side portions 204 can form the remaining portion of the U-shape. Each outer segment side portions 204 can comprise one or more slots 205. Furthermore, each outer segment side portions 204 can comprise an inner portion 206 and an outer portion 207. Inner portion 206 can be a part of each outer segment side portion 204 that extends below middle segment 202, which can form a pair of inner notches 208. Outer portion 207 can extend below inner portions 206 to form a pair of outer notches 209. Slots 205 can be placed at the outer surface of each outer portion 207. Notches 208 and 209 can be the indentions that are formed between corresponding outer segment side portions 204, each on opposite outer segment 201. Inner notches 208 can accommodate metal wires of various sizes. In an example embodiment, lateral inner notches 208 can be designed to be installed with wires of up to ½", ⅝", and ¾."

Middle segment 202 can connect outer segments 201. Middle segment 202 can comprise a vertically protruding middle section 210. Vertically protruding middle section 210 can be a substantial portion of middle segment 202 that is predominantly raised relative to outer segment top portion 203.

Figure 3:
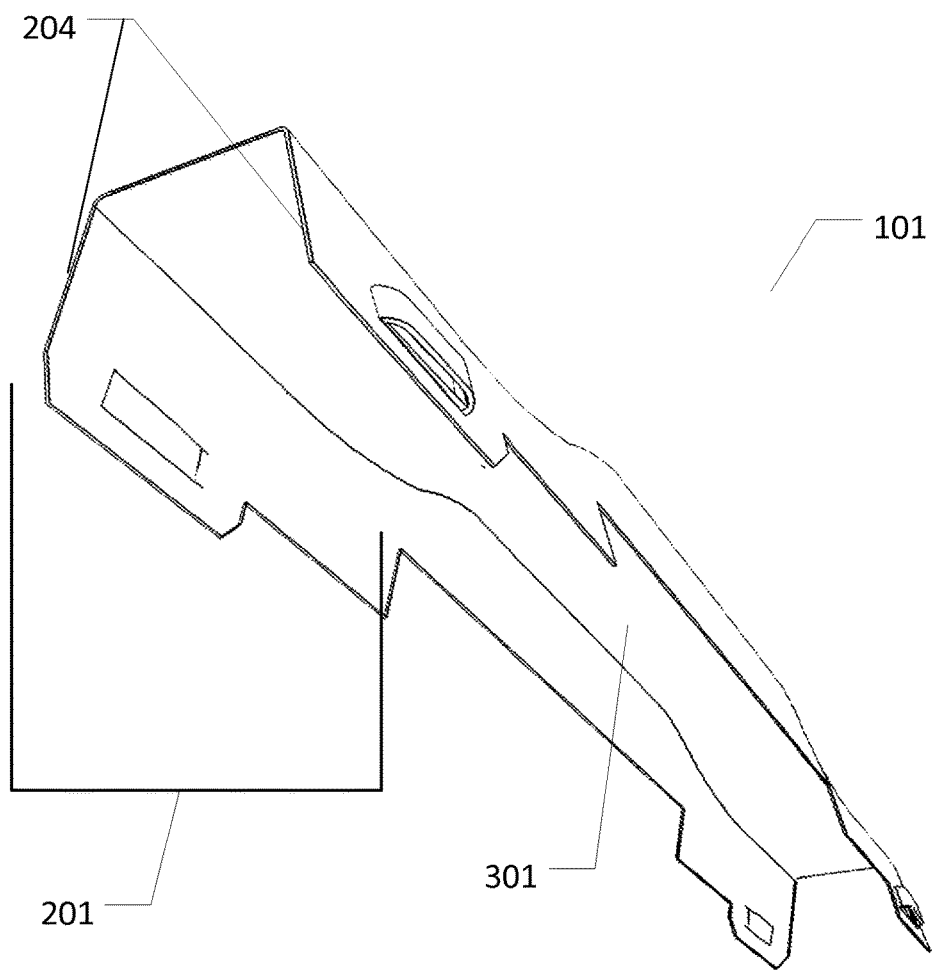
FIG. 3 illustrates a bottom view of a cable clamp.

FIG. 3 illustrates a bottom view of cable clamp 101. The bottom surface of cable clamp 101 can comprise a concave portion 301. Concave portion 301 can be the space formed within the inner surface of cable clamp 101 and outer segments 201. The bottom surface of cable clamp 101 can accommodate cable, pipe, and/or tubing that have irregular shape or protruding portions. Moreover, outer segment side portions 204 can extend out as each outer segment side portions 204 extends downward. This feature can allow multiple cable clamps 101 be stackable. In an example embodiment, cable clamp 101 can accommodate cables #2 and #4.

Figure 4:
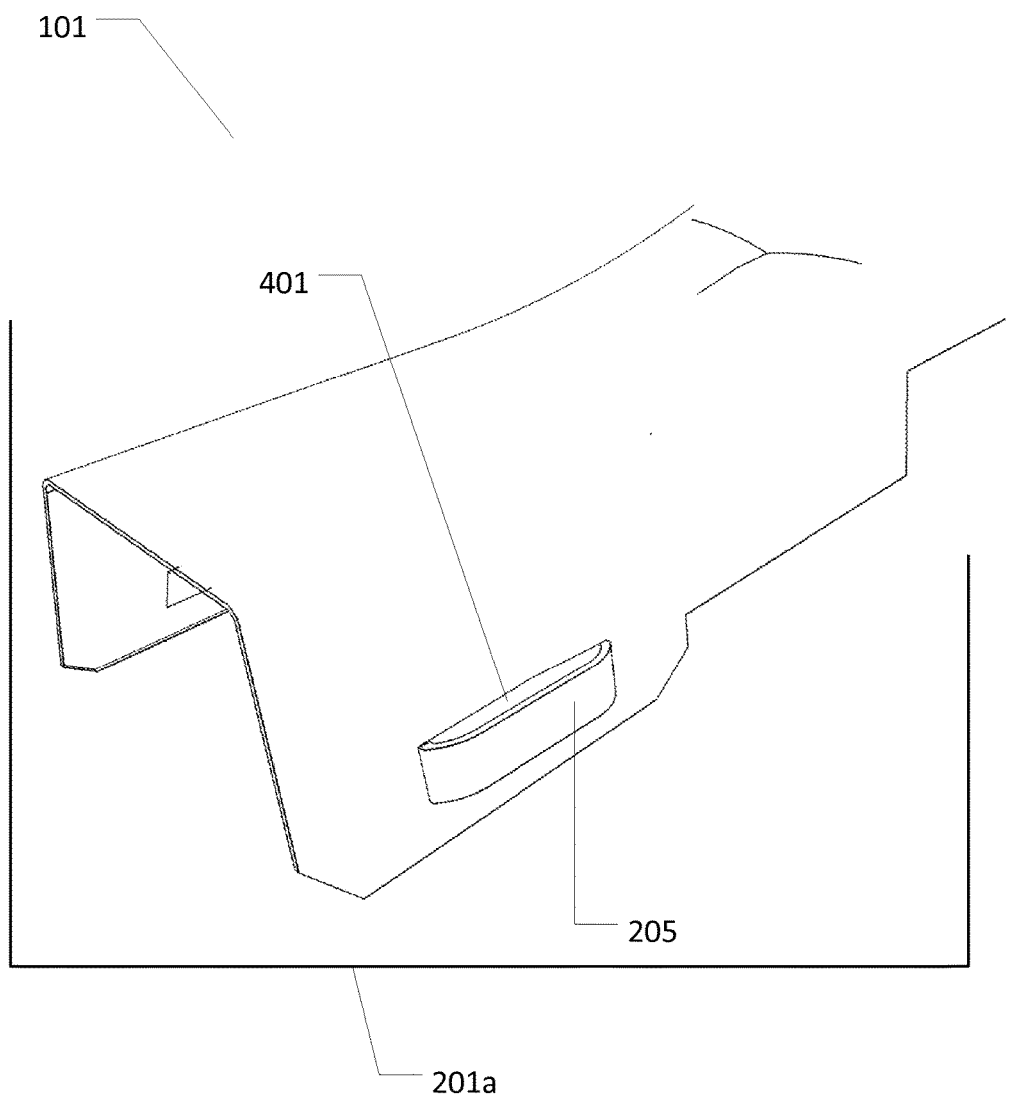
FIG. 4 illustrates a first outer segment at one end of cable clamp 201.

FIG. 4 illustrates a first outer segment 201a at one end of cable clamp 101. In a preferred embodiment, each outer segment 201 can comprise a pair of slots 205, each slot 205 placed parallel to each other and attached on each outer segment side portion 204. Each slot 205 can comprise an opening 401. Opening 401 can be a hole created between each outer segment side portion 204 and each slot 205. Each slot 205 can be compatible with strips 102 such that each strip 102 can be insertable within opening 401 of each slot 205. In a preferred embodiment, each strip 102 can fit snugly within each pair of slots 205.

Figure 5:
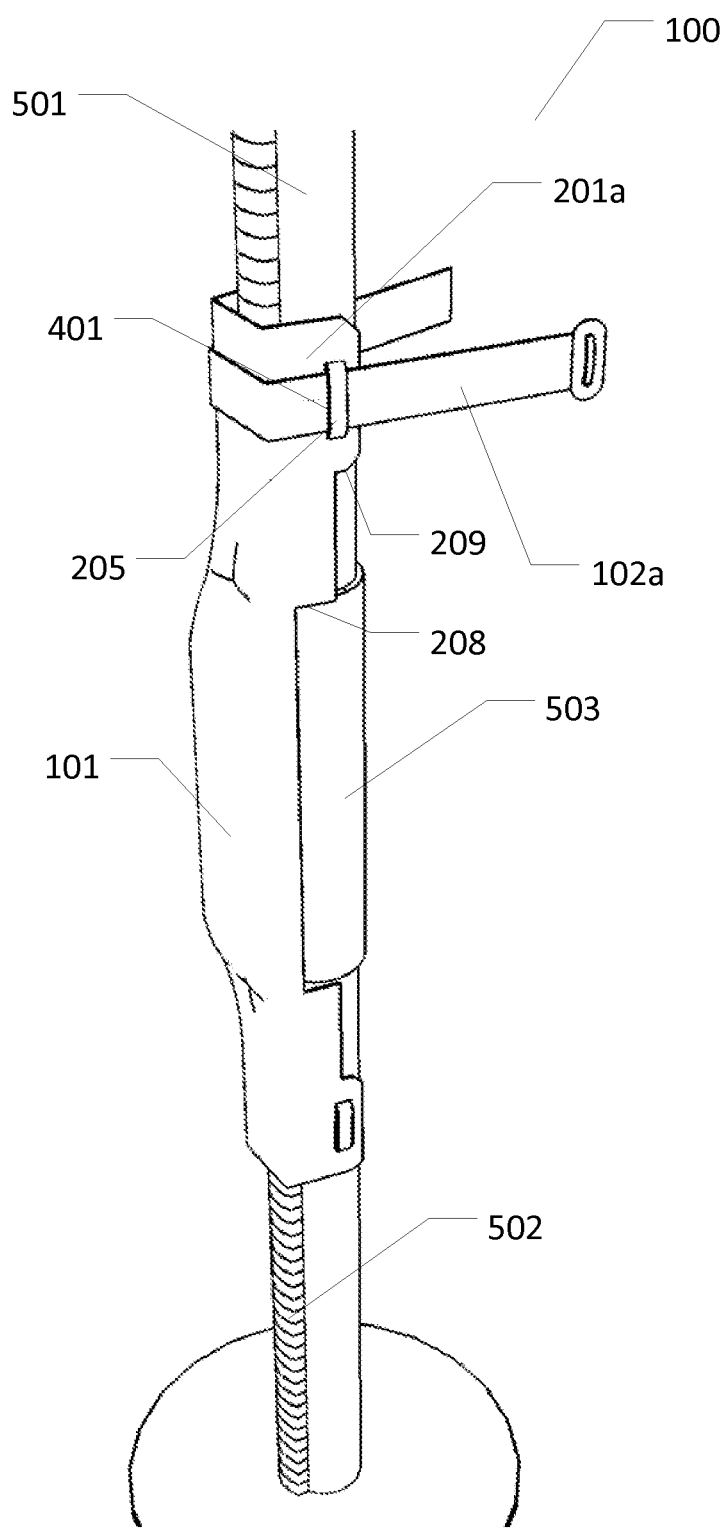
FIG. 5 illustrates a cable clamp mounted to a production pipe and a wire guide.

FIG. 5 illustrates cable clamp 101 mounted to a production pipe 501 and a wire guide 502. As an example scenario, production pipe 501 can comprise a radially extended section 503. One example of radially extended section 503 is a pipe joint that connects two segments of production pipe 501. In this example, wire guide 502 can be placed along production pipe 501 and over radially extended section 503. The curvature of cable clamp 101 can protect and hold wire guide 502 firmly in place, while not pushing wire guide 502 too firmly against radially extended section 503. Initially, cable clamp 101 can be mounted onto wire guide 502 and production pipe 501 placing concave portion 301 over radially extended section 503 of production pipe 501. When wire guide 502 is placed on top of production pipe 501, a raised area is formed at the surface of radially extended section 503. The curvature of cable clamp 101 that comprises vertically protruding middle section 210 can accommodate the raised portion that is formed around radially extended section 503. Furthermore, concave portion 301 can be positioned over radially extended section 503, such that radially extended section 503 can be within outer notches 209. In a preferred embodiment, inner notches 208 can rest at the opposite edges of radially extended section 503. Notches 208 and 209 can prevent cable clamp 101 from slipping out of radially extended section 503. As an example scenario, when cable clamp 101 slides up or down from production pipe 501 the edges of notches 208 and/or 209 can be blocked by the protruding edges of radially extended section 503 thus, preventing cable clamp 101 from completely slipping out of radially extended section 503. Next, a first strip 102a can be attached on first outer segment 201a of cable clamp 101. A user can first insert one end of first strip 102a within opening 401 of slots 205 of first outer segment 201a.

Figure 6:
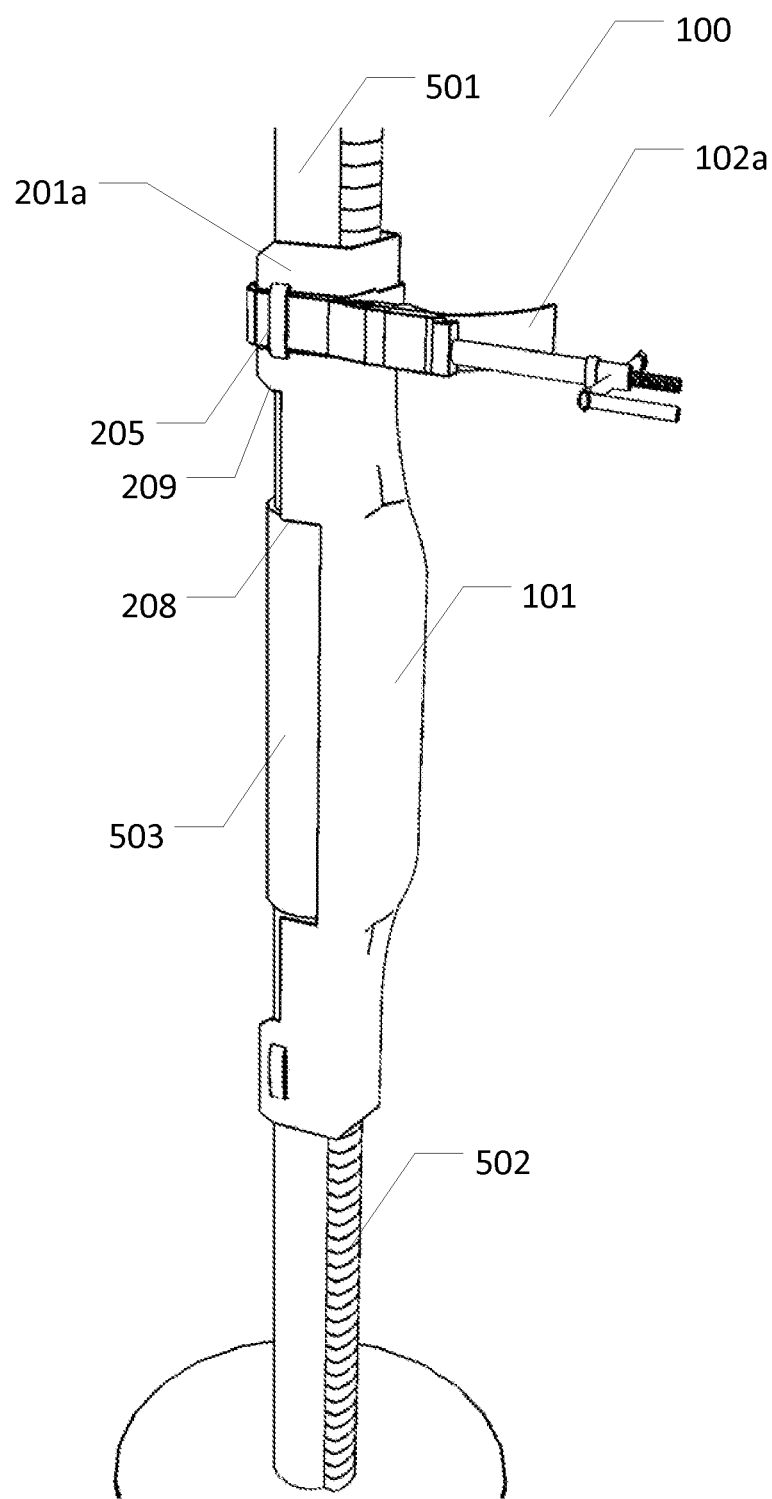
FIG. 6 illustrates fastening a first strip within a pair of slots on a first outer segment.

FIG. 6 illustrates fastening first strip 102a within slots 205 on first outer segment 201a. Once first strip 102a is inserted within slots 205 of first outer segment 201a, the user can use a crimping device to tighten first strip 102a onto cable clamp 101, production pipe 501, and wire guide 502. After ensuring that first strip 102a is wrapped securely around cable clamp 101, production pipe 501, and wire guide 502, the user can cut the unused extended portion of first strip 102a.

Figure 7:
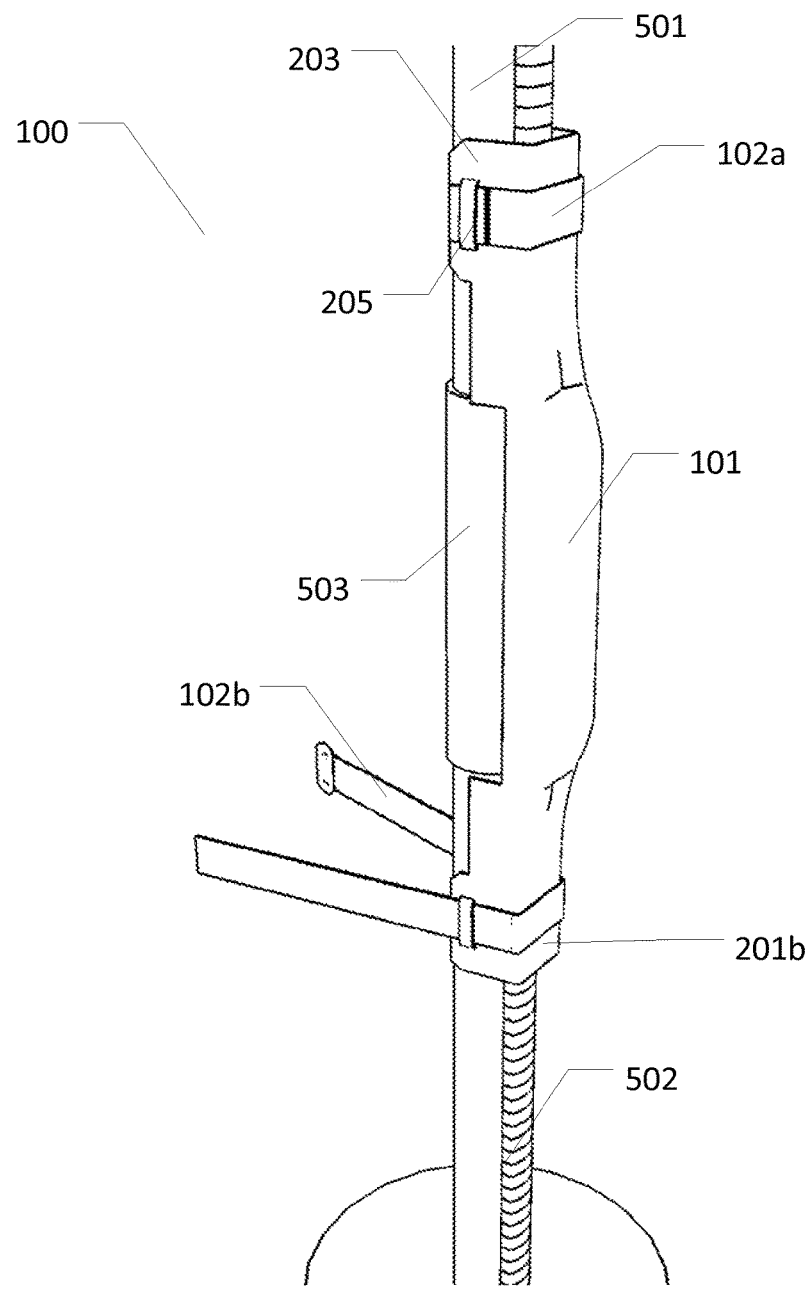
FIG. 7 illustrates a first strip attached securely within a pair of slots of a first outer segment.

FIG. 7 illustrates first strip 102a attached securely within slots 205 of first outer segment 201a. After securing first strip 102a on first outer segment 201a, the user can proceed in attaching a second strip 102b within slots 205 of a second outer segment 201b by repeating the same process discussed in FIGS. 5 and 6.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A cable clamp comprising
   a pair of outer segments protruding in opposite directions, each of said outer segments comprising an outer segment top portion and outer segment side portions, said outer segment top portion and said outer segment side portions connected substantially in a U-shape, each of said outer segment side portions comprising one or more slots;
   a middle segment connecting said outer segments, at least a substantial portion of said middle segment predominantly raised relative to said outer segment top portions, wherein said outer segment side portions extend below said middle segment to form a pair of inner notches.

2. The cable clamp of claim 1 wherein said outer segment side portions each comprise an inner portion and an outer portion, said slots on said outer portions, further said outer portions extending below said inner portions to form a pair of outer notches.

3. The cable clamp of claim 1 wherein said outer segment side portions each extend out as each extends downward.

4. A method for protecting downhole cable comprising
   mounting a cable clamp at the surface of a cable guide along radially extended section of a production pipe, said cable clamp comprising
      a pair of outer segments protruding in opposite directions, each of said outer segments comprising an outer segment top portion and outer segment side portions, said outer segment top portion and said outer segment side portions connected substantially in a U-shape, each of said outer segment side portions comprising one or more slots; and
      a middle segment connecting said outer segments, at least a substantial portion said middle segment predominantly raised relative to said outer segment top portions, wherein said outer segment side portions extend below said middle segment to form a pair of inner notches; and
   inserting strips within each of said set of slots; and
   tightening said strip onto said housing to secure said cable guide to said production pipe.

5. The method of claim 4 wherein mounting said cable clamp comprises placing said radially extended selection within said inner notches.

6. The method of claim 4 wherein said outer segment side portions each comprise an inner portion and an outer portion, said slots on said outer portions, further said outer portions extending below said inner portions to form a pair of outer notches.

7. The method of claim 6 wherein mounting said cable clamp comprises placing said radially extended selection within said outer notches.

8. The method of claim 2 wherein said outer segment side portions each extend outward as each extends downward.

9. A cable clamp comprising
a pair of outer segments protruding in opposite directions, each of said outer segments comprising an outer segment top portion and outer segment side portions, said outer segment top portion and said outer segment side portions connected substantially in a U-shape, each of said outer segment side portions comprising one or more slots;
a middle segment connecting said outer segments wherein said outer segment side portions extend below said middle segment to form a pair of inner notches; and
a plurality of progressively deeper narrow notches formed by edges of said outer segment side portions and said middle segment.

\* \* \* \* \*